United States Patent [19]

Aoki et al.

[11] Patent Number: 5,696,550
[45] Date of Patent: Dec. 9, 1997

[54] IMAGE QUALITY INSPECTION SYSTEM

[75] Inventors: Hiroyuki Aoki, Gyoda; Yoshihisa Matsumura, Kohnosu; Hiroto Satoh, Kohnosu; Teruhiko Nagashima, Kohnosu; Masaki Hayashi, Hanyu, all of Japan

[73] Assignee: Advantest Corporation, Tokyo, Japan

[21] Appl. No.: 502,533

[22] Filed: Jul. 14, 1995

[30] Foreign Application Priority Data

Jul. 14, 1994 [JP] Japan .................. 6-185484
Aug. 12, 1994 [JP] Japan .................. 6-211765

[51] Int. Cl.⁶ .................................................. H04N 7/18
[52] U.S. Cl. .................................... 348/125; 324/770
[58] Field of Search .............................. 324/770; 348/86, 348/79, 87, 88, 92, 93, 125, 126, 129, 128, 131, 189; 382/144, 145, 147, 148, 149, 153

[56] References Cited

U.S. PATENT DOCUMENTS

| | | | |
|---|---|---|---|
| 4,783,826 | 11/1988 | Koso | 382/147 |
| 4,870,357 | 9/1989 | Young et al. | 324/770 |
| 5,204,739 | 4/1993 | Domenicali | 348/79 |
| 5,319,459 | 6/1994 | Mochizuki | 348/189 |
| 5,504,438 | 4/1996 | Henley | 324/770 |
| 5,543,729 | 8/1996 | Henley | 324/770 |

*Primary Examiner*—Amelia Au
*Attorney, Agent, or Firm*—Knobbe, Martens, Olson & Bear, LLP

[57] ABSTRACT

An image quality inspection system determines view angle dependent defects by capturing an LCD image viewed obliquely over the entire LCD panel while in focus. The system obtains the positions of each of the LCD pixels from the distorted screen as a CCD pixel address and captures the CCD image precisely. In a first embodiment, a second CCD camera has a built-in CCD area sensor and measures the contrast of the LCD obliquely. The second CCD camera has a built-in tilt lens system or a built-in shift lens systems which allows it to focus on the entire LCD panel plane. In order to convert the distorted image on the CCD pixels to a normal LCD image, an LCD driver section generates a calibration pattern, an image measuring section converts the measured values of the CCD pixels to digital signals, a CCD address setting for the LCD pixels seeks sampling addresses of the entire LCD pixels as real numbers, and a presampling processor uses interpolation to convert the digital signals to an image having the number of pixels of the LCD panel. In a second embodiment, an image element, such as a CCD, is mobile in parallel with the lens plane in all directions. A lens is mobile vertically with respect to the above image element. Together, the lens and the image element provide a camera assembly which is combined as one body.

6 Claims, 7 Drawing Sheets

SOUGHT ADDRESS
FIG.5b

FIG.6a

FIG.6b
BRIGHTNESS DATA

FIG.6c
AREA

FIG. 7a

FIG. 7b
BRIGHTNESS DATA

FIG. 7c
AREA

IMAGE QUALITY INSPECTION SYSTEM

FIELD OF THE INVENTION

This invention relates to a camera that can detect view angle dependent defects of a panel to be inspected, such as, for example, an LCD panel, and, more particularly, relates to an image quality inspection system equipped with an optical system such as said camera.

BACKGROUND OF THE INVENTION

Figure 4A:
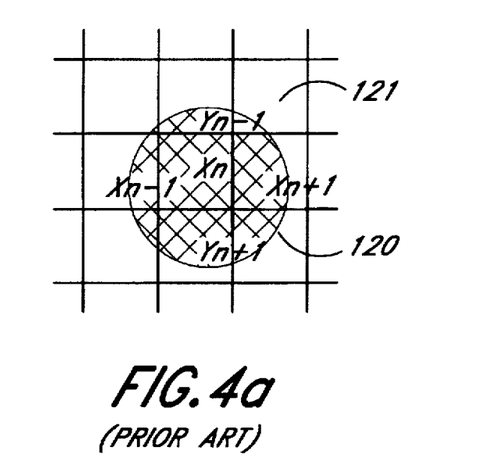
FIGS. 4a and 4b are diagrams which illustrate the way the LCD luminescent spots are taken into the CCD pixels.
Figure 4B:
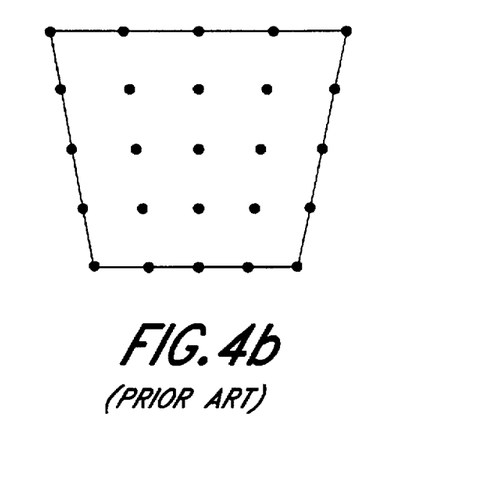
Figures 13A, 13B:
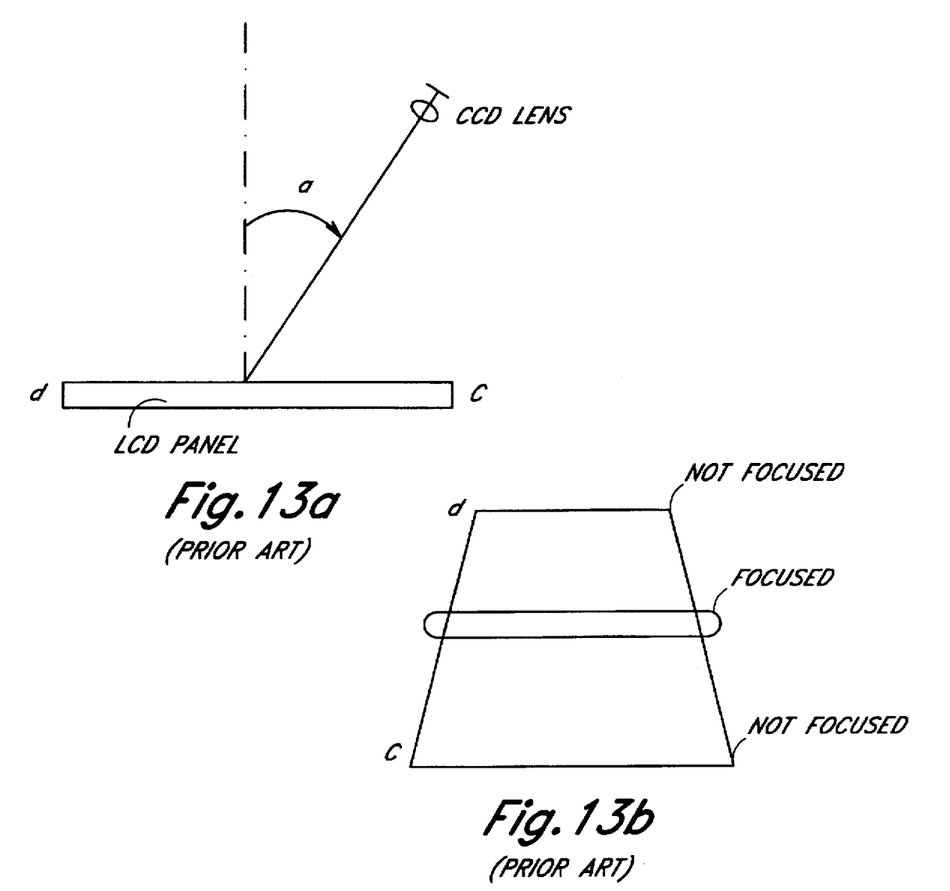
FIGS. 13a and 13b are diagrams illustrating the use of a conventional camera.
Figure 14:
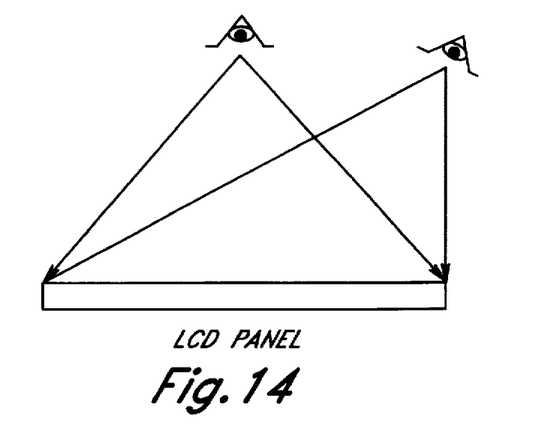
FIG. 14 is a diagram illustrating a conventional visual inspection.

Among LCD (Liquid Crystal Display) defects, when viewing a LCD panel from the front, a LCD panel image quality inspection system of the prior art can detect white and black point defects and line defects. However, there is a view angle dependent defect among LCD panel defects which can be found when viewed obliquely as shown in FIG. 4. Here, when the LCD panel is observed with a conventional camera obliquely as shown in FIG. 13(a), only one segment can be focused as shown in FIG. 13(b). As a result, the image becomes distorted and it can not be inspected. Therefore, the view angle dependent defects rely on visual inspection.

As mentioned above, ordinary lenses and cameras view objects from the front, and when they focus on one segment by tilting, other segments can not be focused. Furthermore, an image taken in obliquely results in distortion in comparison with the image taken in from the front.

SUMMARY OF THE INVENTION

The first objective of this invention is to realize a image quality inspection system that can determine view angle dependent defects by capturing an LCD image viewed obliquely over the entire LCD panel 110 while in focus, obtaining the positions of the entire LCD pixels from the distorted screen as a CCD (Charge Coupled Device) pixel address and taking in the CCD image precisely.

In order to achieve the above objective, the present invention includes two CCD cameras. A first CCD camera has a built-in CCD area sensor and measures the contrast of the LCD panel from the front. A second CCD camera has a built-in CCD area sensor and measures the contrast of the LCD obliquely. Because the second CCD camera measures the contrast of the LCD obliquely, an ordinary lens system can focus only on one segment. For this reason, the second CCD camera has a built-in tilt lens system or a built-in shift lens system.

Furthermore, because the second CCD camera views the LCD image obliquely, the image on the CCD pixels may be distorted. In order to convert the distorted image on the CCD pixels to a normal LCD image, the present invention includes an LCD driver section which displays calibration patterns or test patterns on the LCD panel to be inspected. An image measuring section performs A/D conversion on the contrast measured by the CCD pixels. A CCD address setting system for the LCD pixels specifies the positions of the LCD pixels and corresponding CCD pixels using the recognition pattern of the calibration pattern and seeks the sampling addresses of the entire LCD pixels from the recognition pattern of the CCD addresses as real numbers. A presampling processor measures the image of the LCD panel using the CCD and converts the measured image to an image with the same number of pixels of the LCD panel by interpolation using the sampling addresses.

The present invention provides the LCD panel image quality inspection system by using a defect determination system which determines defects based on the contrast data of each LCD pixel obtained as the image of the LCD panel. A control section controls the overall flow. A display section displays the LCD image and a status of operation control.

The above-described image quality inspection system can determine view angle dependent defects by capturing an LCD image viewed obliquely over the entire LCD panel while in focus. The system obtains the positions of the entire LCD pixels from the distorted screen as a CCD (Charge Coupled Device) pixel address and captures the CCD image precisely.

The second objective of the present invention is to provide a camera which can detect view angle dependent defects by capturing the LCD image viewed obliquely over the entire LCD panel plane while in focus without distorting the image, and to provide an image quality inspection system using the camera.

In order to achieve the above objective, the present invention includes an image element such as a CCD (Charged Coupled Device) which is mobile in all directions and is maintained in parallel with the lens plane. The invention also includes a lens which can move vertically with respect to the image element. The image element and the lens form a camera which outputs image data. The image element and lens are moved by a transfer system vertically as well as horizontally in all directions with respect to the plane of the panel to be inspected (e.g., an LCD panel). In addition, an A/D conversion section converts image data output from the camera to digital signals.

A CPU control section controls the movement of the image element and the lens of the above-described camera. The CPU control section processes the digital signals representing the image and detects image defects.

Furthermore, multiple cameras, each having an image element and a lens disposed in parallel with the panel to be inspected, are arranged in front of the panel to be inspected and in the oblique direction to permit the detection of view angle dependent defects. Multiple A/D conversion sections convert image data output from the cameras to digital signals. A multiplexer selects the outputs of the multiple A/D conversion sections, and the CPU processes the digital representations of the images which are output from the multiplexer to detect image defects.

Furthermore, multiple cameras, each having an image element and a lens disposed in parallel with the panel to be inspected, are arranged in front of the panel to be inspected and in the oblique direction to permit the detection of view angle dependent defects. A data selector selects and outputs image data output from each camera. An A/D conversion section converts the outputs from the above selector to digital signals. A CPU processes the digital representations of the images and detects image defects.

In the above-described camera, an image viewed obliquely over the entire panel to be inspected can be captured without producing distortion in the image. In addition, the image quality inspection system using the mobile camera described above can detect view angle dependent defects at an arbitrary angle.

Furthermore, in one embodiment of the image quality inspection system described above, multiple cameras are fixed obliquely to detect view angle dependent defects. In this embodiment, no camera control by the CPU and no mechanism for the camera movement are required, and no time is wasted for the camera movement. Hence, the image quality inspection system can be operated at high speeds and can be built inexpensively and compactly.

DETAILED DESCRIPTION OF THE PREFERRED EMBODIMENTS

The first embodiment of the present invention is described below with reference to the figures.

In order to determine the view angle dependent defects, firstly, a lens system is required which can focus over the entire plane of the LCD panel 110 when viewed obliquely. Two lens systems satisfy the above objective—a tilt lens system and a shift lens systems.

(A) Tilt Lens System

Figure 2A:
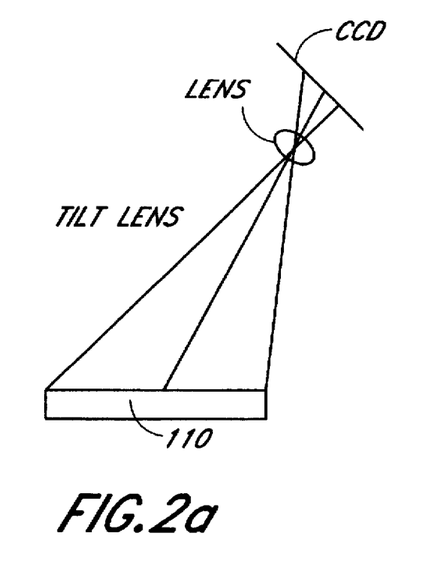
FIGS. 2a and 2b are diagrams which illustrated the lens system used in this invention.

A tilt lens system can be used as a lens system when focusing on the entire surface of the LCD panel inclined with respect to the CCD pixel plane. This lens system upsets the vertical relationship between the CCD plane and lens optical axis, and, as illustrated in FIG. 2(a), when the lens plane is tilted and the angle between the LCD panel plane and lens optical axis approaches a right angle, the entire LCD panel plane, which is not parallel to the CCD plane, can be focused.

(B) Shift Lens System

Figure 2B:
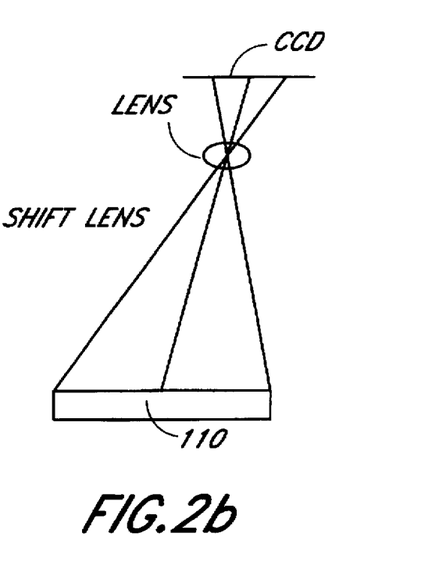

As illustrated in FIG. 2(b), in a shift lens system, the CCD plane and LCD panel plane are fixed so as to make them parallel to each other. The distorted image of the LCD panel becomes the image viewed from the front by shifting a lens mirror cylinder toward the LCD panel. It should be noted that in this lens system, the entire LCD panel plane can be focused.

The LCD image obtained by the tilt lens system and the shift lens system may be distorted. However, even if the image is distorted, the LCD image can be obtained by measuring each pixel of the LCD panel through a presampling process.

Although the presampling method is described in detail in Japanese Utility Patent 1994-185483 (filed on Jul. 14, 1994), the method is repeated below.

Figure 3:
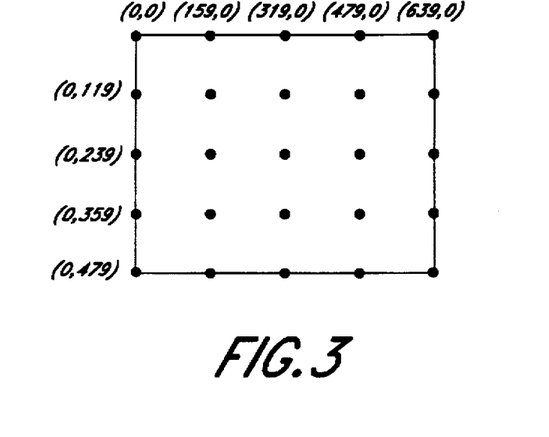
FIG. 3 is a diagram which illustrates the calibration pattern.

(1) Specify the addresses of the LCD pixels and corresponding CCD pixels for the luminescent spots of the calibration pattern:

First, the calibration pattern is displayed on the LCD panel with 640×480 pixels as shown in FIG. 3. The calibration pattern displays 25 luminescent spots at the addresses of the LCD pixels shown in FIG. 3. For example, the LCD contrast is measured with 3×3 pixels (a total of nine CCD pixels for one LCD pixel) by using a CCD area sensor with 1534×1024 pixels. The luminescent spots of the LCD are taken into the CCD pixels as an image as shown in FIG. 4(a).

Figure 5A:
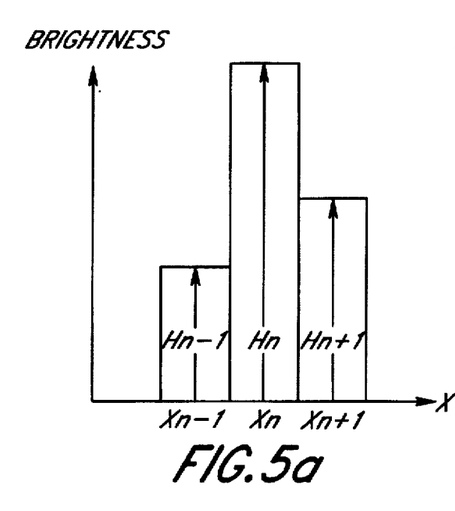
FIGS. 5a and 5b are diagrams which illustrate the method of seeking the addresses in the X direction of the luminescent spots.
Figure 5B:
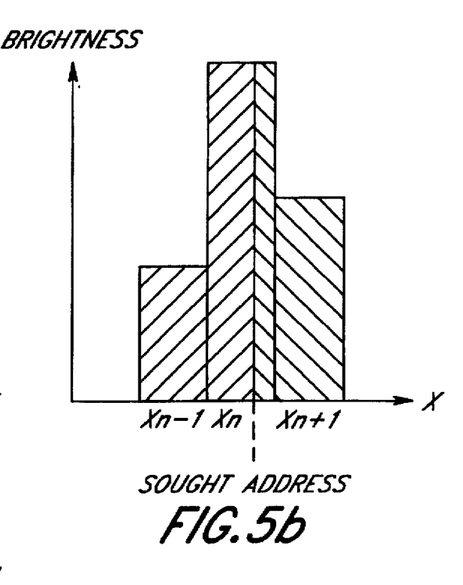

The address of the luminescent spot is accurately found as follows. The maximum value of the contrast from a neighborhood of the luminescent spots of the measured image by the CCD is sought and its pixel is defined as a center. As shown in FIG. 5(a), the center pixel is denoted as "$X_n$", the contrast values of the adjacent pixels $X_{n-1}$, $X_{n+1}$ are also measured. A line that divides the hatched area of FIG. 5(b) into equal areas is the address sought in the X direction. The formula is expressed as follows:

$$\text{Address sought in the } X \text{ direction} = X_n + (H_{n+1} - H_{n-1})/2H_n$$

By carrying out the same computation in the Y direction, the address in the Y direction of the luminescent spot is found. By performing this operation for 25 luminescent spots, CCD addresses for the luminescent spots of 25 LCD pixels in the X and Y directions can be calculated.

(2) Create sampling addresses of each of the LCD pixels:

The image received in the calibration pattern is divided into 16 domains with the luminescent spots forming a square. For each domain the addresses of the CCD measuring pixels corresponding to the pixels of the LCD panel contained in the domain are calculated using real numbers. This calculation is derived from the relationship between the addresses of the squares (i.e., of luminescent spots) and the pixel address of the LCD panel at the luminescent spots. By this operation, the sampling addresses are defined, which represent the addresses of the CCD pixels corresponding to the addresses of the LCD pixels.

(3) Convert to an image with the pixel size of the LCD panel by the presampling process.

The image on the LCD panel to be presampled is measured by the CCD. The measured pixels are converted to an image with the same pixel size as the LCD panel by liner interpolation on the neighboring 4 or 9 pixels using the previously found sampling addresses.

(4) Linear interpolation on the four neighboring pixels.

Figure 6A:
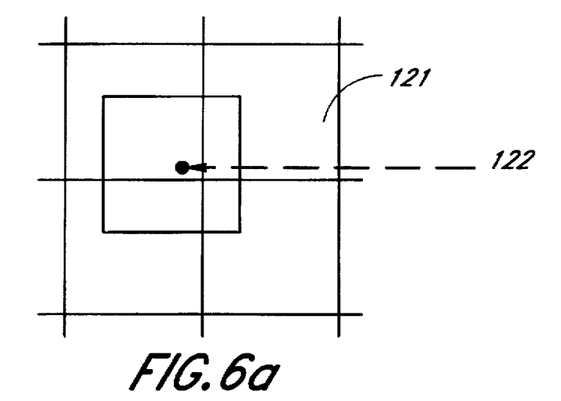
FIGS. 6a, 6b and 6c are diagrams which illustrate seeking the contrast of the LCD pixels on four neighboring pixels by linear interpolation.
Figure 6B:
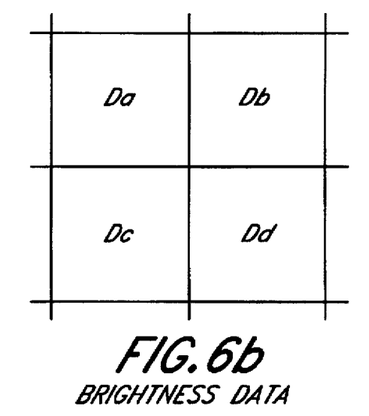
Figure 6C:
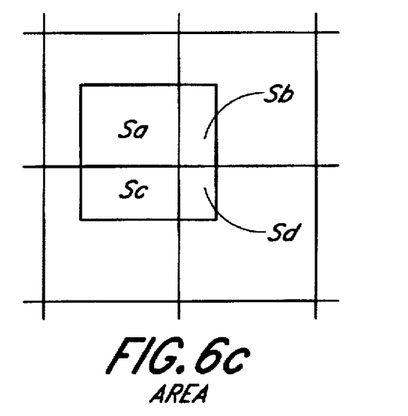

Consider a 1 pixel×1 pixel square with the sampling address 22 as its center as shown in FIG. 6(a). This square falls in the image of four CCD pixels. As shown in FIG. 6(b) and (c), the contrast data of each pixel and ratios of the overlapped areas of the squares in each pixel are computed. Multiplying the contrast values by the corresponding ratios, and adding them together yields the presampling value. This calculation is expressed as follows:

$$\text{Presampling result} = da \times sa + db \times sb + dc \times sc + dd \times sd$$

(5) Linear interpolation on the neighboring 9 pixels.

Figure 7A:
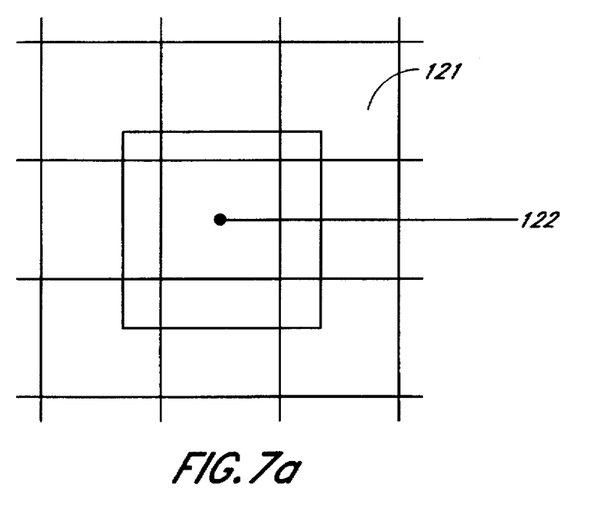
FIGS. 7a, 7b and 7c are diagrams which illustrate seeking the contrast of the LCD pixels on nine neighboring pixels by linear interpolation.
Figure 7B:
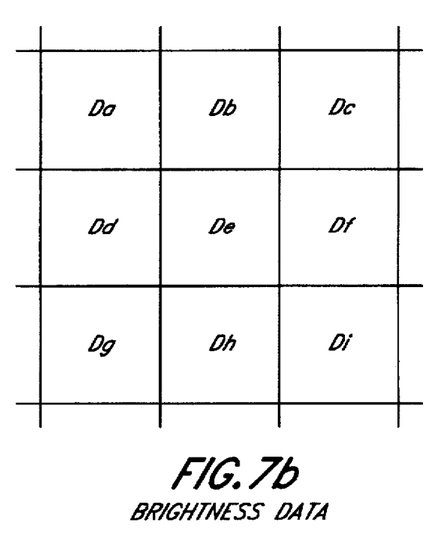
Figure 7C:
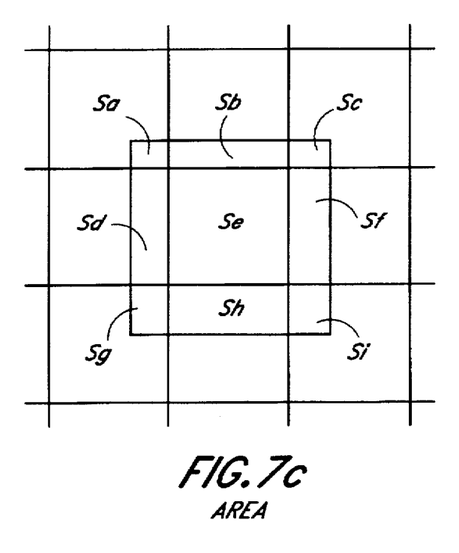

Consider a 2×2 (i.e., 2 pixels long by 2 pixels wide) square with the sampling address 22 as its center as shown in FIG. 7(a). This square falls as an image in nine CCD pixels. As shown in FIG. 7(b) and (c), the contrast data (i.e., the measured intensity) of each pixel and ratios of the overlapped areas of the squares in each pixel are computed. Multiplying the contrast values by the corresponding ratios, adding them together and dividing the summed value by 4 yields the presampling value.

By this way, the presampling process is performed using the presampling method.

Figure 1:
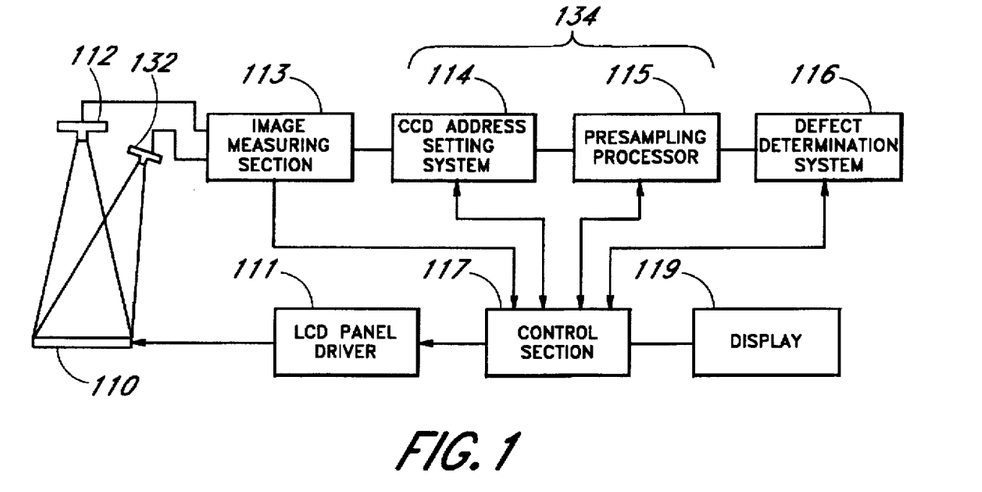
FIG. 1 is a block diagram of the first embodiment by the present invention.

FIG. 1 shows a block diagram of the LCD panel image quality inspection system equipped with a second CCD camera 132 which has a lens system to measure the LCD panel obliquely. The LCD panel image quality inspection system in accordance with the first embodiment of this invention comprises a LCD panel 110 to be inspected. An LCD panel driver section 111 displays the calibration pattern and various test patterns on the LCD panel 110 to be tested. A first CCD camera 112 has a built-in CCD area sensor and measures the contrast of the LCD from the front. The second CCD camera 132 similarly has a built-in CCD area sensor and measures the contrast of the LCD obliquely. An image measuring section 113 converts the contrast signals measured by the CCD pixels to digital signals. A CCD address setting system 114 specifies the positions of the LCD pixels and corresponding CCD pixels using the luminescent spots of the calibration pattern and seeks the sampling addresses of the entire LCD pixels from the CCD addresses of the luminescent spots. A presampling processor 115 measures the image on the LCD panel using the CCD, linearly interpolates using the above sampling addresses, and converts to a screen with the pixel size of the LCD panel. A defect determination system 116 determines defects based on the contrast data of each LCD pixel obtained as the image of the LCD panel. A control section 117 displays the LCD image and a status of control operation. Here, the CCD address setting system 114 for the LCD pixels and the presampling processor 115 are called a distortion compensation processor 134 because they measure and detect the distorted image appeared on the CCD panel as a normal LCD image.

The first embodiment of this invention, as described above, provides an LCD panel image quality inspection system which can determine view angle dependent defects by capturing a LCD image viewed obliquely over the entire LCD panel while in focus. The inspection system obtains the positions of the entire LCD pixels from the distorted screen as a CCD pixel address and captures the CCD image precisely.

The second embodiment of this invention is described below with reference to the figures.

Figure 10A:
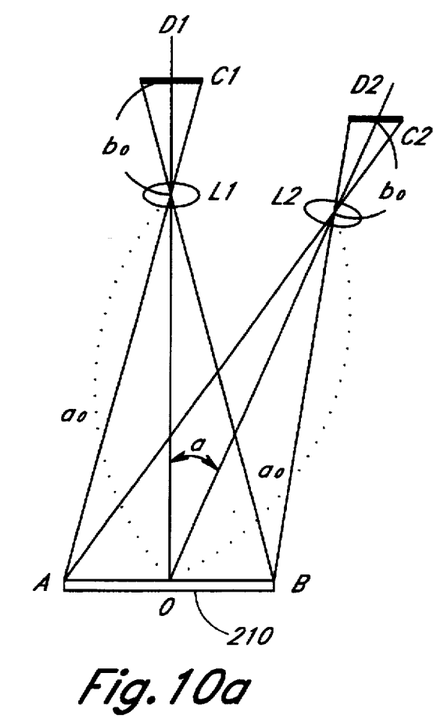
FIGS. 10a and 10b are diagrams which illustrate the principle of the second embodiment of the present invention.
Figure 10B:
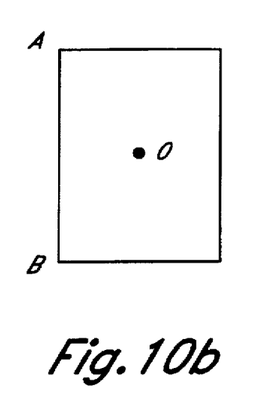

FIGS. 10(a) and 10(b) illustrate the relationship of the LCD panel, the lens and the area CCD which captures the LCD image over the entire LCD panel while in focus and produces no distortion. In this figure, C1 is the area CCD element at a view angle of zero degrees; L1 is the lens at a view angle of zero degrees; C2 is the area CCD sensor at a view angle of α degrees; L2 is the lens at a view angle of α degrees; A-B is the LCD panel; O-D1 is an optical axis at a view angle of 0 degrees; and O-D2 is an optical angle at a view angle of α degrees.

C1, L1 and the LCD panel are set to satisfy the following relationship in the paraxial ray if m is a magnification factor and f is a focal distance of the lens, $$a_o = f(1+m)$$

$$m = a_o/b_o$$

When the LCD image is captured at a view angle of α degrees by moving to C2 and L2 which satisfy the angle α, $a_o$ and $b_o$ as shown in FIG. 10(a), an image on the C2 area CCD element is created. The image has the same dimension as the LCD image at a view angle of 0 degrees as shown in FIG. 10(b).

Figure 9:
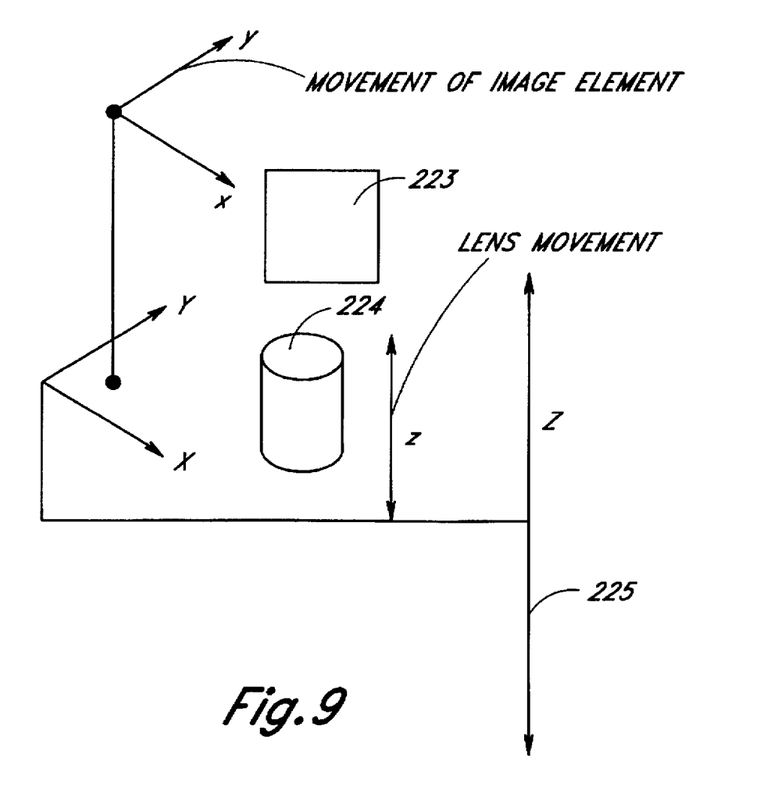
FIG. 9 is a diagram which illustrate the camera control of the second embodiment by the present invention.

View angle dependent defects of the LCD panel can be dependent on the oblique directions in the X and Y directions. For this reason, as shown in FIG. 9, a structure is required which allows the whole camera, including the CCD and lens, to move in the X, Y, and Z directions, which allows the CCD to move in the x and y directions, and which allows the lens to move in the z direction, all independently.

Here, the movement of the camera in the Z direction and the movement of the lens in the z direction are required to set the magnification factor and focal point precisely and compensate the lens aberration and the individual difference of the lenses as well. In addition, the camera movement in the X and Y directions and the CCD movement in the x and y directions are necessary to capture an image obliquely without moving the LCD panel.

Figure 8:
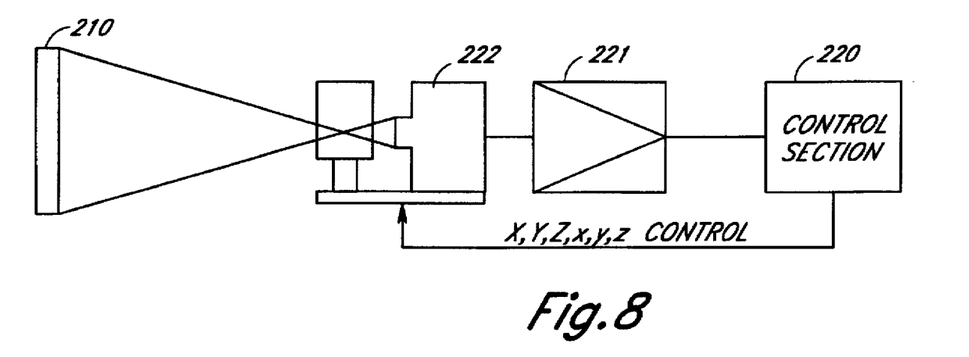
FIG. 8 is a block diagram of the image quality inspection system of the second embodiment by this invention.

FIG. 8 illustrates shows the image quality inspection system where a CPU control section 220 controls the movement of a camera 222 containing the CCD and lens in the X, Y and Z directions, controls the movement of the CCD in the x and y directions, and controls the movement of the lens in the z direction. An A/D conversion section 221 converts the image data output from the camera at each position to digital signals. A CPU control section 220 detects defects by image processing.

Figure 11:
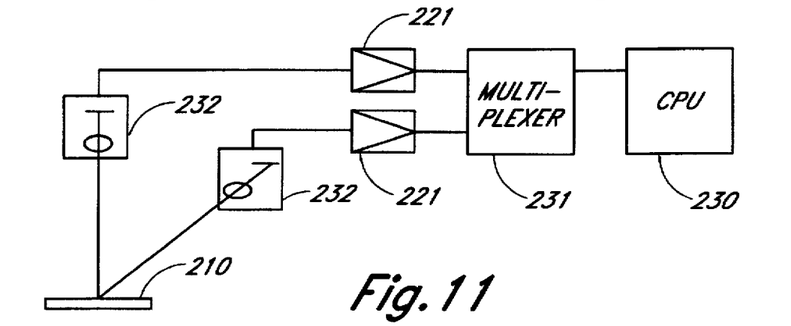
FIG. 11 is a diagram of another image quality inspection system based on the second embodiment by this invention.

FIG. 11 illustrates the image quality inspection system which detects view angle dependent defects. In the image quality inspection system of FIG. 11, a camera which measures the image from the front and multiple cameras which measure the image data obliquely are fixed. The image data which are output from each camera are converted to digital signals by the corresponding A/D conversion section 221. The CPU 230 detects defects by image processing.

Figure 12:
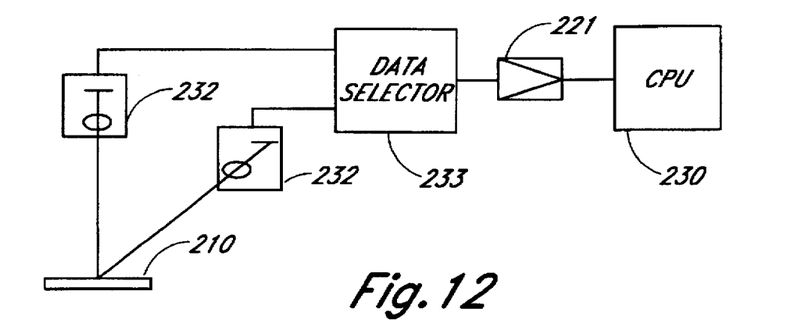
FIG. 12 is a diagram of another image quality inspection system based on the second embodiment by this invention.

FIG. 12 illustrates the image quality inspection system which detects view angle dependent defects. A camera which measures the image from the front and multiple cameras which measure the image data obliquely are fixed. A data selector 233 selects and outputs the image data which are output from each camera. The CPU 230 detects defects by image processing.

In the image quality inspection systems described above where multiple cameras are fixed, no camera control by the CPU is required because the cameras do not move. Therefore, no time is wasted for the camera movement and no mechanism for the camera movement is required. Hence, the image quality inspection system can be operated in high speeds and built inexpensively and compactly.

Note that the above presampling method can be combined with the second embodiment of this invention. In this case, further image processing can be performed to compensate for distortion.

The above description was set forth in detail for the inspection of an LCD panel using an area CCD element as an image element. However, this invention is not limited by these elements. The invention extends to flat panels in general such as, for example, to an EL (Electroluminescent) panel and to a plasma display panel, and to MOS (Metal Oxide Semiconductor) type sensors such as an image sensor.

Because the system is structured as described above, this invention has the following effects.

1) When the panel to be inspected is viewed obliquely, the invention can capture the image over the entire plane while in focus and obtain the image without distortion.

2) The invention provides an image quality inspection system which can detect view angle dependent defects by moving the camera at an arbitrary view angle.

3) Multiple cameras are fixed at positions which permit the cameras to inspect a panel to be inspected from the front and to inspect view angle dependent defects. No camera control by the CPU is required, and therefore no time is wasted for the camera movement and no mechanism for the camera movement is required. Hence, the image quality inspection system can be operated in high speeds and built inexpensively and compactly.

Although described above with reference to the preferred embodiments, modifications within the scope of the invention may be apparent to those skilled in the art, all such modifications are intended to be within the scope of the appended claims.

What is claimed is:

1. An image quality inspection system, comprising:
   an LCD (Liquid Crystal Display) driver section which displays a calibration pattern and a test pattern on an LCD panel comprising LCD pixels to be inspected;
   a first CCD (Charge-Coupled Device) camera having a built-in CCD area sensor comprising CCD pixels, said first CCD camera measuring a first contrast image of the LCD panel from the front;
   a second CCD camera having a built-in CCD area sensor comprising CCD pixels, said second CCD camera measuring a second contrast image of the LCD panel obliquely;
   an image measuring section which converts signals representing the contrast images measured by the CCD pixels to digital signals;
   a CCD address setting system which specifies the position of the LCD pixels and corresponding CCD pixels using the a recognition pattern provided in the calibration pattern in real numbers and which determines sampling addresses of the entire LCD pixels with reference to CCD addresses of the recognition pattern as real numbers;
   a presampling processor which receives digital signals from the image measuring section indicating the first or second contrast image on said LCD panel and applies said sampling addresses to said digital signals to linearly interpolate said image and convert said image to an image having the pixel size of said LCD panel;
   a defect determination system which determines defects based on contrast data of each LCD pixel obtained as the image of the LCD panel;
   a control section which controls an overall flow in the inspection system; and
   a display section which displays an LCD image and a status of control operation.

2. The image quality inspection system of claim 1, wherein the second CCD camera comprises a tilt lens system which measures said second contrast image obliquely.

3. The image quality inspection system of claim 1, wherein said second CCD camera comprises a shift lens system which measures said second contrast image obliquely.

4. An image quality inspection system, comprising:
   an image element comprising CCD pixels which is mobile in an plane parallel to a lens plane and which outputs image data;
   a lens which is mobile in a vertical direction relative to said image element;
   a transfer mechanism which shifts positions of said image element and said lens as one body vertically and horizontally relative to a plane of an LCD panel having LCD pixels to be inspected;
   an A/D conversion section which converts said image data output from said image element to digital signals;
   a CPU control section which controls the positions of said image element and said lens, said CPU control section processing said digital signals to detect image defects on said display panel, wherein said CPU control section comprises:
     a CCD address setting system which specifies positions of said LCD pixels and corresponding CCD pixels in said image element using a calibration pattern in real numbers and which determines sampling addresses of said LCD pixels relative to addresses of said CCD pixels for said calibration pattern as real numbers;
     a presampling processor which receives said digital signals from said A/D conversion section indicating an image on said LCD panel and which uses said sampling addresses to linearly interpolate said image data from said image element to convert said image data to an image having the pixel size of said LCD panel; and
     a defect determination system which determines defects based on contrast data of each LCD pixel obtained as an image of the LCD panel.

5. An image quality inspection system, comprising:
   a plurality of cameras each of which is formed of an image element having CCD pixels and a lens, said image element and lens being arranged in parallel with a plane of an LCD panel having LCD pixels to be inspected, said plurality of cameras being positioned in front of and obliquely of said LCD panel to be inspected, and each of said cameras generating image data;
   a plurality of A/D conversion sections which convert image data output from each camera to digital image signals;
   a multiplexer which selects and outputs digital image signals from said A/D conversion sections; and
   a CPU control which processes said digital image signals and detects image defects, wherein said CPU control section comprises:
     a CCD address setting system which specifies positions of said LCD pixels and corresponding CCD pixels in said image element in each of said cameras using a calibration pattern in real numbers and which determines sampling addresses of said LCD pixels relative to addresses of said CCD pixels in said cameras for said calibration pattern as real numbers;
     a presampling processor which receives said digital signals from said A/D conversion sections and which uses said sampling addresses to linearly interpolate said image data from said cameras to convert said image data to an image having the pixel size of said LCD panel; and
     a defect determination system which determines defects based on contrast data of each LCD pixel obtained as an image of the LCD panel.

6. An image quality inspection system, comprising:
   a plurality of cameras each of which is formed of an image element having CCD pixels and a lens said image element and lens being arranged in parallel with a plane of an LCD panel having LCD pixels to be inspected, said plurality of cameras being positioned in front of and obliquely of said LCD panel to be inspected, and of said each cameras outputting image data;
   a data selector which selects and outputs one of said image data from said cameras;
   an A/D conversion section which converts said image data output from said data selector to digital image signals; and a CPU control which processes said digital image signals and detects image defects, wherein said CPU control section comprises:

a CCD address setting system which specifies positions of said LCD pixels and corresponding CCD pixels in said image element in each of said cameras using a calibration pattern in real numbers and which determines sampling addresses of said LCD pixels relative to addresses of said CCD pixels in said cameras for said calibration pattern as real numbers;

a presampling processor which receives said digital image signals from said A/D conversion section and which uses said sampling addresses to linearly interpolate said image data from said cameras to convert said image data to an image having the pixel size of said LCD panel; and a defect determination system which determines defects based on contrast data of each LCD pixel obtained as an image of the LCD panel.

\* \* \* \* \*